David W. Pilcher
INVENTOR.

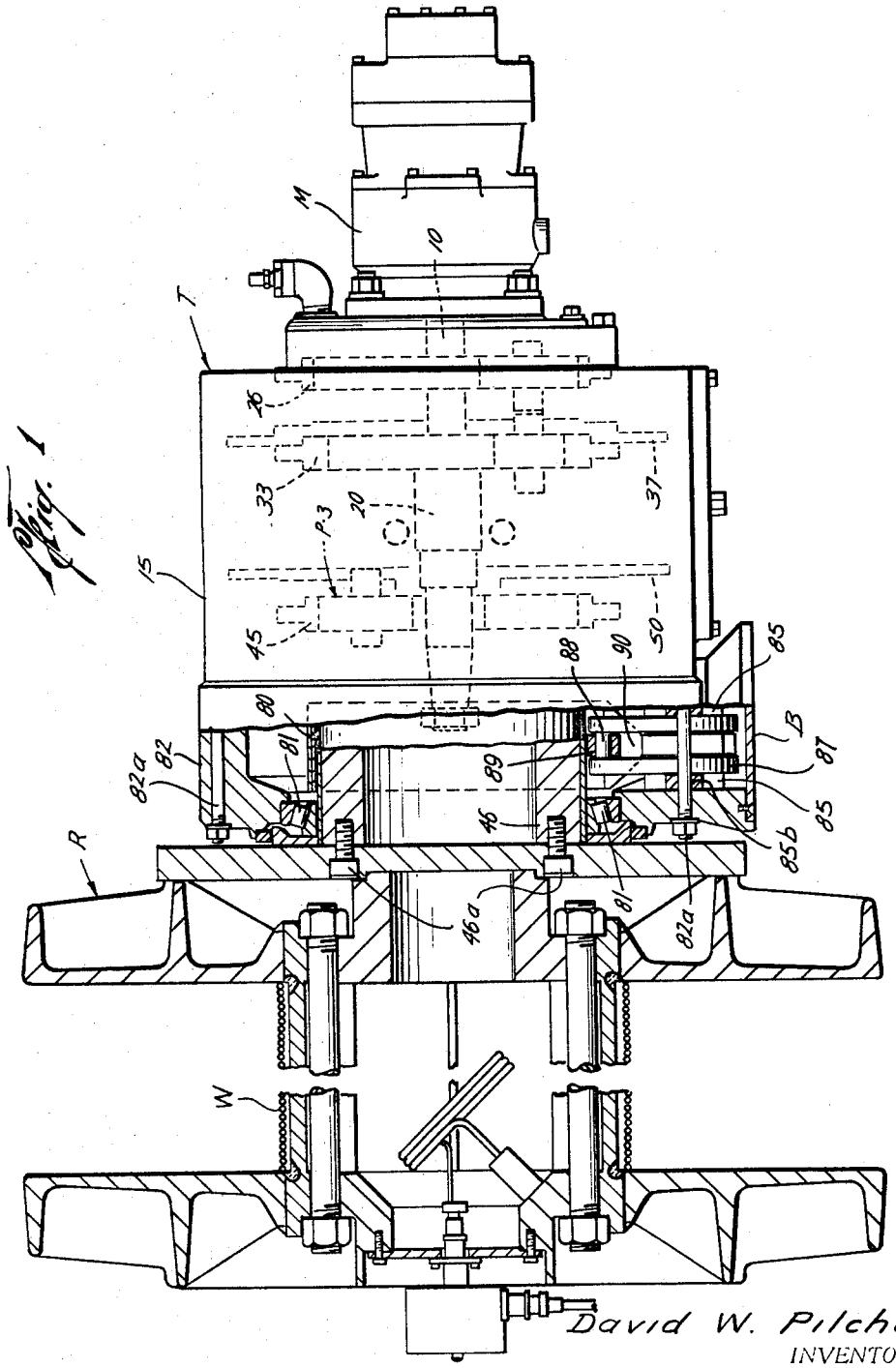

BY Hayden & Pravel
ATTORNEYS

David W. Pilcher
INVENTOR.

BY Hayden & Pravel
ATTORNEYS

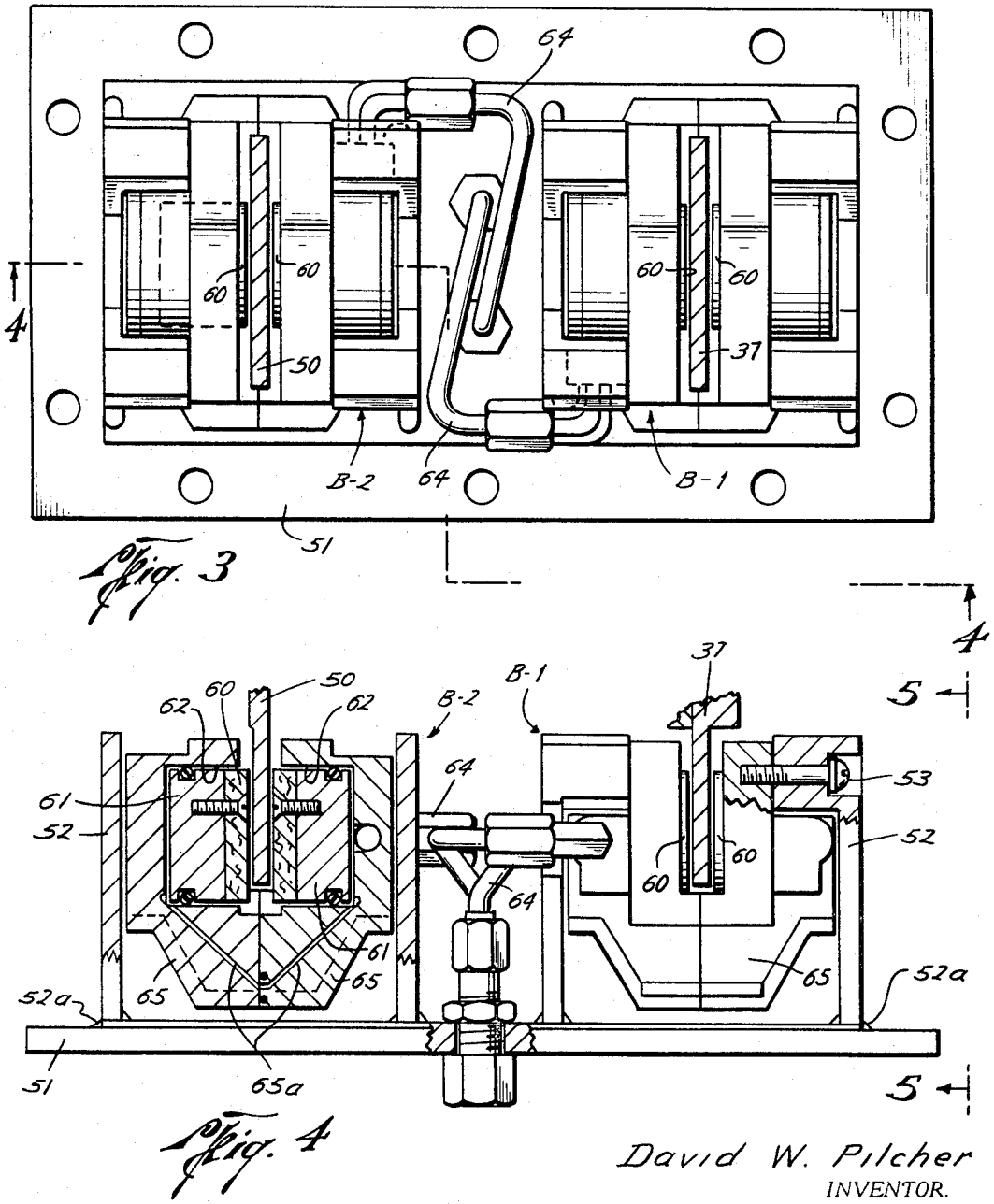

Nov. 4, 1969    D. W. PILCHER    3,475,991
TRANSMISSION ASSEMBLY
Filed July 17, 1967    5 Sheets-Sheet 5
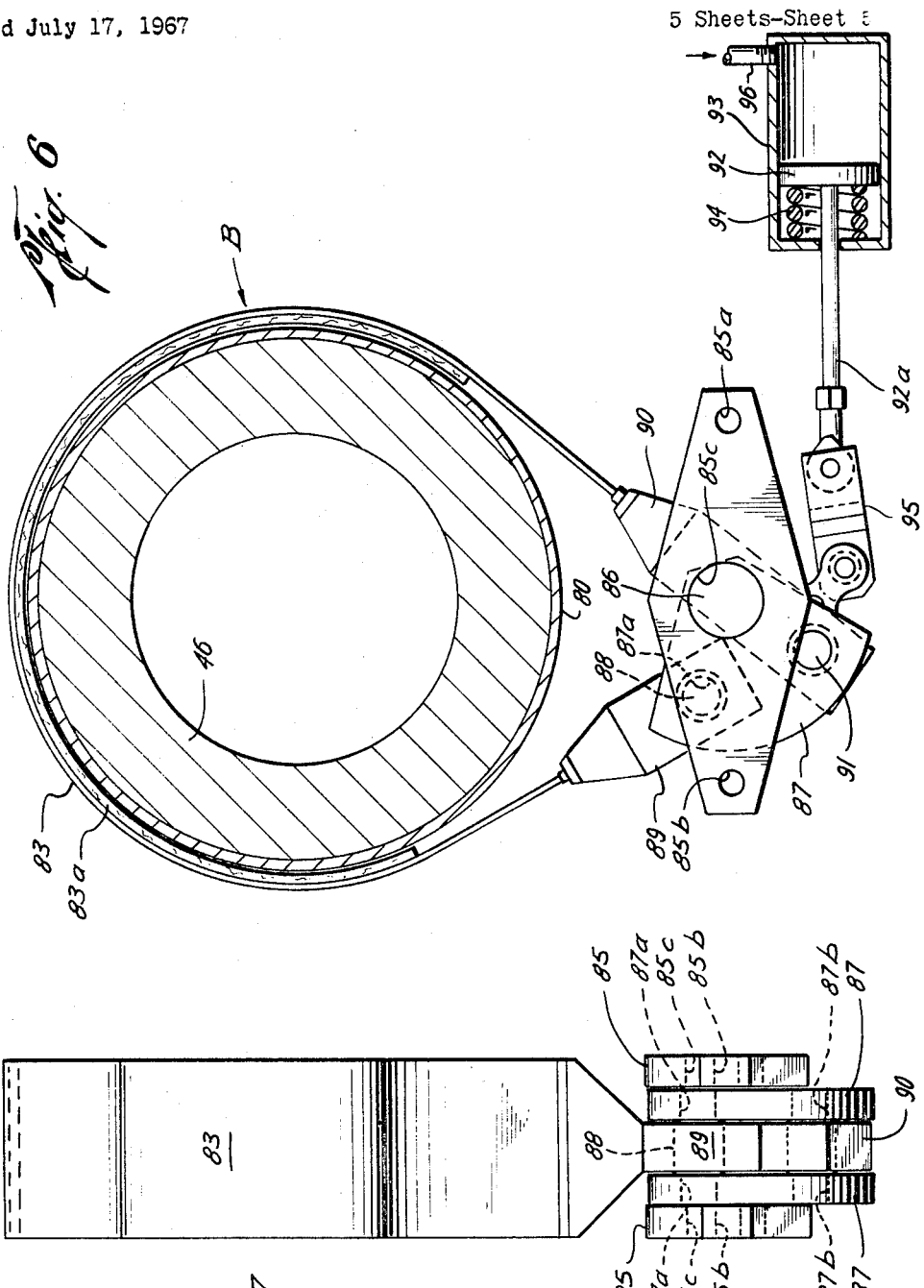
David W. Pilcher
INVENTOR.
BY Hayden & Pravel
ATTORNEYS United States Patent Office 3,475,991
Patented Nov. 4, 1969

3,475,991
TRANSMISSION ASSEMBLY
David W. Pilcher, Pampa, Tex., assignor to Bowen Tools, Inc., a corporation of Texas
Filed July 17, 1967, Ser. No. 653,933
Int. Cl. F16h 57/10
U.S. Cl. 74—758       4 Claims

ABSTRACT OF THE DISCLOSURE

A transmission assembly which provides for multiple output speeds without shifting gears and which may be freely rotated by a driven object such as a reel at the output end of the assembly and which may be partially or fully braked to control such free rotation or driving action.

BACKGROUND OF THE INVENTION

This invention is in the field of gear train transmissions wherein a power input is transmitted to a driven object such as a reel. In the winding and unwinding of a wireline or cable with respect to a reel, particularly in well operations, the requirements for handling such reel often change rapidly, depending upon the weight of the wireline or cable suspended therefrom, the rate at which it is desired to feed or retract the wireline or cable, and other factors. Mechanical and fluid transmissions heretofore used have been unsatisfactory for the many variable conditions thus encountered.

SUMMARY OF THE INVENTION

The present invention provides a mechanical transmission connected to a reel or the like, and which transmission is capable of being rapidly changed to different operating conditions such as encountered when winding and unwinding a flexible line such as a wireline or cable relative to its reel. The transmission is constructed so that it has multiple output speeds for driving a reel or the like, and the different output speeds may be obtained without a clutch or shifting of gears. Additionally, the transmission may be used without any power input to permit either an unrestrained unwinding of the flexible line from the reel, or a partial or total braking of such reel as the flexible line is unwinding therefrom.

BRIEF DESCRIPTION OF THE DRAWING

FIG. 1 is a sectional view, partly in elevation, of the transmission assembly of the present invention connected to a reel;

FIG. 3 is a sectional view taken on line 3—3 of FIG. 1A to illustrate the preferred braking means for the transmission assembly;

FIG. 4 is a vertical sectional view, partly in elevation, taken on line 4—4 of FIG. 3 further illustrating the braking means;

FIG. 6 is a sectional view, partly in elevation, illustrating the preferred embodiment of a safety brake mechanism for the reel operated by the transmission assembly of the present invention; and FIG. 7 is an end view of the safety brake mechanism of FIG. 6.

DESCRIPTION OF THE PREFERRED EMBODIMENTS

Figure 1A:
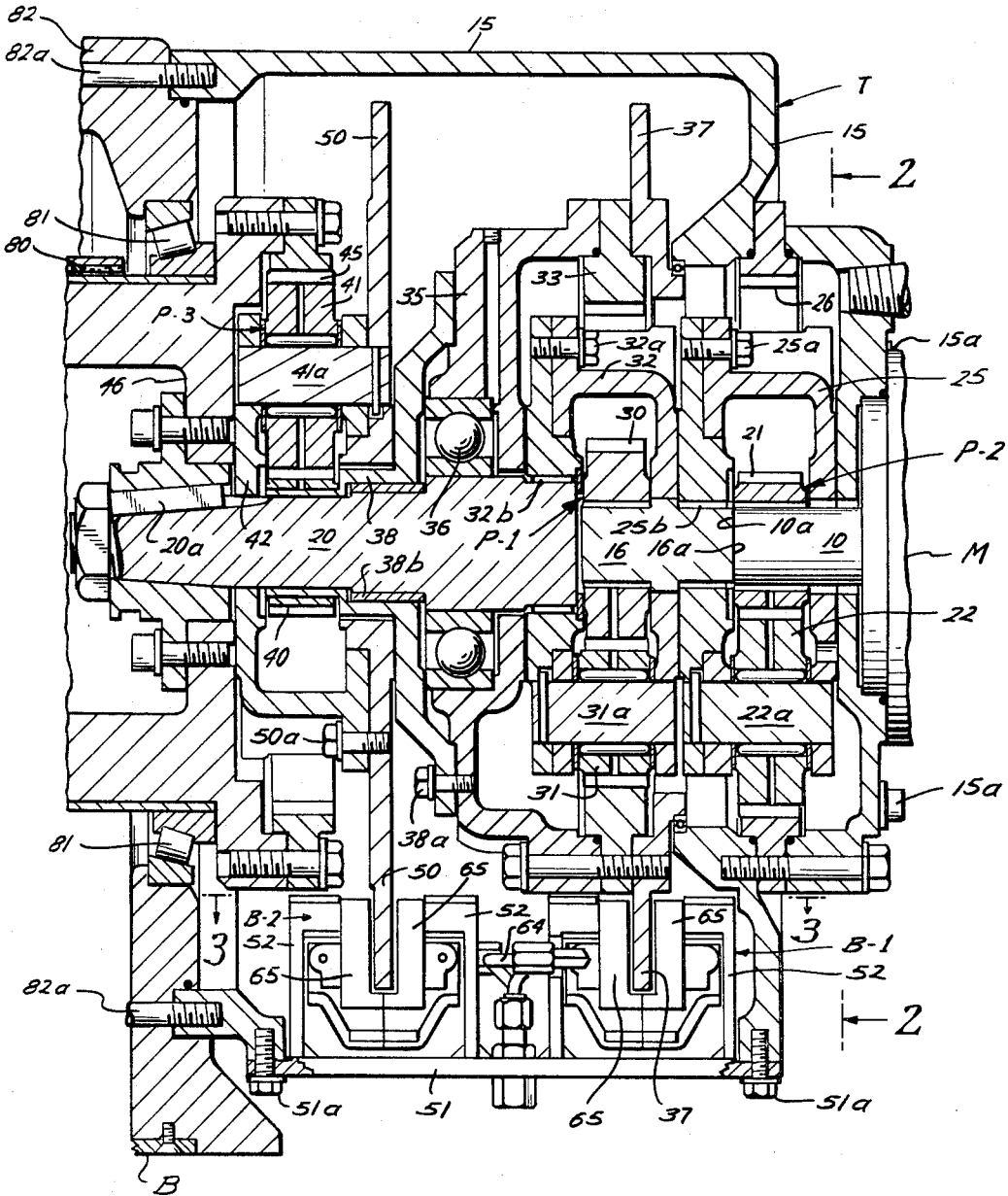
FIG. 1A is an enlarged view, in section, of the transmision assembly of the present invention.
Figure 5:
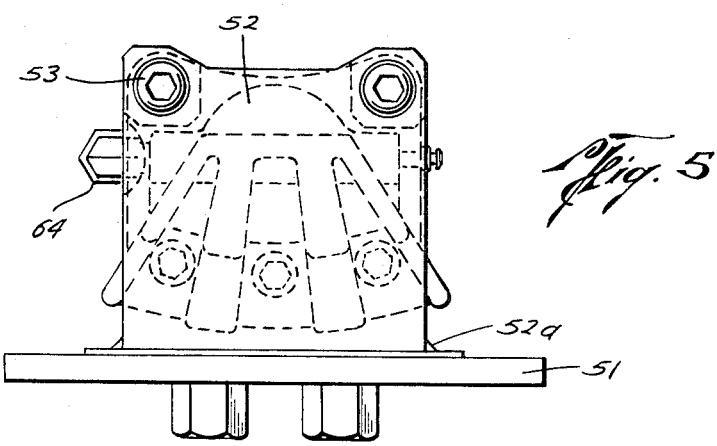
FIG. 5 is an end view of the braking means of FIGS. 3 and 4, taken on line 5—5 of FIG. 4.

In the drawings, the letter T designates generally the transmission assembly of the present invention which is adapted to be connected to a power input source M such as a motor operated by electricity, fluid pressure, or similar means. The transmission assembly T is especially suitable for operation with a reel R which may be used for winding and unwinding a wireline W or any other flexible line, particularly as used in conjunction with well operations. As will be explained in detail, the transmission assembly T is constructed so that it may shift from one speed ratio to another without the shifting of gears or other use of a clutch. Additionally, a constant speed may be maintained even at low speeds, and the constant speed of the power input may be varied by the changes in the gear ratio within the transmission assembly. When the power input is not driving the transmission T, the reel movements may be controlled through the transmission T for either free-wheeling of the reel R, or partially or fully braked control of the movement of the reel R.

Considering the invention more in detail, the motor or input power source M is connected to an input shaft 10 which terminates at its inward end 10a. The shaft 10 extends into any suitable housing 15 to which the motor M is mounted using suitable bolts 15a or other suitable securing means.

An extension shaft 16 is disposed in axial alignment with the input shaft 10, and for certain desired operating conditions, the two shafts 10 and 16 may be a single shaft, but as illustrated, the shafts 10 and 16 are independently rotatable and are not connected at their ends 10a and 16a, respectively.

In the preferred form of the invention, an input planetary gear system P-1 is operably connected to the input extension shaft 16, and the input extension shaft 16 is operably connected to the input shaft 10 by an additional planetary gear system P-2 operably mounted on the shaft 10. As will be explained in detail, the planetary gear system P-1 directly drives an output shaft 20, and may additionally drive such output planetary gear system P-3.

Figure 2:
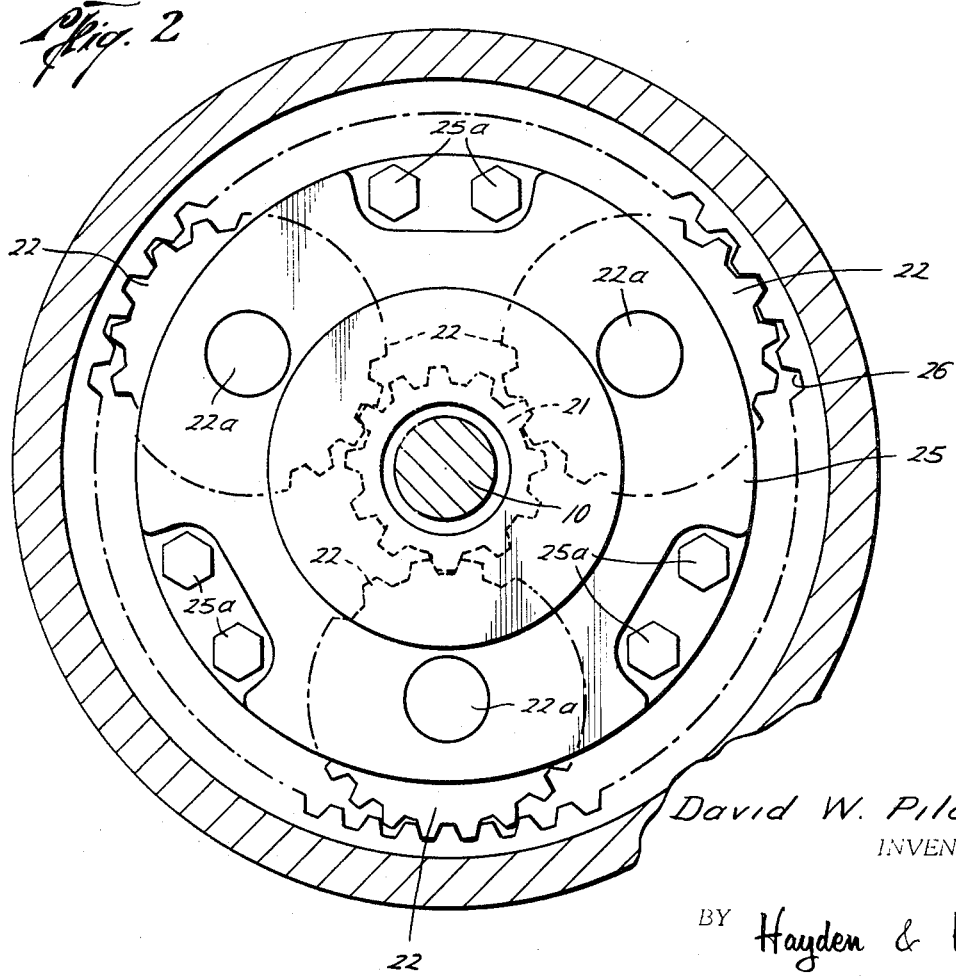
FIG. 2 is a view taken along line 2—2 of FIG. 1A to illustrate details of one of the planetary gear systems in the transmission assembly of the present invention.

The planetary gear system P-2 has a sun gear 21 secured to the input shaft 10 for rotation therewith. Such sun gear 21 is in mesh with three planetary gears 22 (one of which is seen in FIG. 1A). Each of the planetary gears 22 is supported on a spindle 22a (FIG. 2), each of which is secured to a rotatably movable cage 25. The two sections of the cage 25 are held together by bolts or screws 25a, or any suitable means. It is to be noted that the planetary gears 22 extend through suitable openings in the cage 25 for meshing with the teeth on an internal ring gear 26 which is fixed to the housing 15. Thus, rotation imparted to the shaft 10 by the motor M is transmitted from the sun gear 21 to the planetary gears 22, which in turn cause the rotation of the cage 25.

The cage 25 is keyed or splined to the extension shaft 16 at 25b, or it is otherwise suitably secured to such shaft 16 so that the rotation of the cage 25 imparts rotation to the extension shaft 16.

The input planetary system P-1 has a sun gear 30 secured thereto by a key, splines, or any other suitable securing means so that the extension 16 imparts rotation to the sun gear 30. The sun gear 30 meshes with three planetary gears 31, each of which is disposed on a spindle or stub shaft 31a (one of which is shown in FIG. 1A) which are in substantially the same relative positions as the gears 22 and shafts 22a illustrated in FIG. 2 of the drawings. Each of the spindles 31a is secured to a cage 32 which is made in two parts in essentially the same manner as cage 25 and which is held together by a plurality of screws or bolts 32a (FIG. 1A). The cage 32 is splined at 32b, or it is otherwise connected to the output shaft 20 so that rotation of the cage 32 is directly transferred to the output shaft 20.

The input planetary gear system P-1 also includes an internal ring gear 33 which is mounted upon a rotatable support assembly 35. The rotatable support assembly 35 is carried on the shaft 20 in a suitable bearing such as the ball bearings 36, whereby the support 35 is rotatable independently of and relative to the shaft 20. A brake disc 37 is also secured to the support assembly 35 and to the internal ring gear 33 for partially or totally braking the rotation of the support 35 and the ring 33, as will be more fully explained.

A rotatable hub 38 is secured to the rotatable assembly 35 by a suitable means such as machine bolts 38a so that the hub 38 is rotatable with the support assembly 35. A sleeve bearing 38b is preferably provided between the hub 38 and the external surface of the output shaft 20 so that the hub 38 is movable freely with respect to the shaft 20. The hub 38 carries a sun gear 40 therewith for meshing engagement with three planetary gears 41, each of which is mounted upon a spindle or shaft 41a carried in a suitable cage 42 in a manner essentially the same as that described heretofore in connection with a planetary gear system P-2. The planetary gear system P-3 also includes an internal ring gear 45 which is carried on a hollow drive shaft 46 which is secured to the outer end of the output shaft 20 by means of a key 20a or any other suitable securing means.

A brake disc 50 is secured to the cage 42 by means of machine bolts or screws 50a, or any other suitable means, so that the brake disc 50 is rotatable with the cage 42, and likewise the disc 50 may be used to totally or partially prevent movement of the cage 42, as will be more fully explained.

Although various suitable braking means may be used for braking engagement with each of the brake discs 37 and 50, the preferred embodiment is illustrated in FIGS. 1, 1A, and 3–5.

For convenience, the first braking means for the brake disc 37 is designated B-1 and the second brake means for the brake disc 50 is designated B-2. The brake means B-1 and B-2 are preferably both mounted together on a single removable plate 51 which is attached to the housing 15 by suitable machine bolts or screws 51a (FIG. 1A). It will also be appreciated that a plurality of the brake assemblies B-1 and B-2 mounted in pairs on a plurality of housing plates 51 is provided so as to be at circumferential intervals with respect to the brake discs 37 and 50.

Since the brake means or assemblies B-1 and B-2 are identical as illustrated in the drawings, the same numerals are used for corresponding parts in both of the assemblies B-1 and B-2. Thus, each of the brake assemblies B-1 and B-2 includes oppositely disposed brake shoes 60 which are disposed on opposite sides of each of the brake discs 37 and 50 and are normally spaced therefrom except during braking action. Each of the brake shoes is preferably round in shape and is secured to a piston 61 which is mounted in a cylinder 62, into which is introduced fluid under pressure from any suitable source such as through the inlet tubes 64, each of which is connected to a source of fluid under pressure (not shown). 65, each of which has suitable fluid passage openings 65a so as to communicate the fluid pressure to the areas behind each of the pistons 61 from the inlet tubes 64 when it is desired to obtain the braking action. The cylinder bodies 65 are supported on the removable plate 51 by means of frame members 52 and suitable screws 53, or any other suitable securing means. The frame members 52 are welded as indicated at 52a, or are otherwise suitably secured to the movable plate 51. When the fluid pressure in the line 64 is reduced at the source, the piston 61 may move outwardly away from the brake discs 37 and 50 so as to prevent further frictional engagement therewith.

A safety brake B is preferably used with the reel R and the transmission assembly T for providing an automatic braking of the reel R in the event the fluid pressure for controlling the brake shoes 60 is reduced below a predetermined amount. The particular form of the safety brake B may be varied, but as illustrated, an external cylindrical brake drum 80 is provided on the drive shaft 46. The drive shaft 46 is connected to the reel R by bolts or screws 46a or any other suitable connecting means, and the shaft 46 is supported for rotation in suitable bearings 81 in connection with the housing for brake B, which may be formed with or attached to the transmission housing 15.

Preferably, the housing for the brake B is a separate cylindrical assembly 82 which is secured to the transmission housing by long studs or bolts 82a.

A brake band 83 having brake shoe material 83a therewith for frictionally engaging the cylindrical surface of the brake drum 80 is mounted in a position with respect to the drum 80 so that it may be selectively brought into braking contact with the drum 80.

One form of such mechanism includes a pair of side plates 85, each of which has end holes 85a and 85b, through which the machine bolts 82a at the lower portion of the brake housing 82 extend (FIG. 1). Each side plate 85 also has a central opening 85c which is adapted to receive a pivot pin 86 extending into each of a pair of adjacent pivot plates 87 so that such plate 87 may pivot about the pin 86.

One end of the brake band 83 is pivotally connected to the plates 87 by a pivot pin 88 which extends through a connecting bracket 89 and suitable openings 87a in the pivot block 87. The other end of the brake band 83 has a bracket 90 which is pivotally connected to the pivot block 87 by pivot pins 91 which extend through suitable openings 87b in the pivot blocks 87.

The pivot blocks 87 are connected to a movable piston 92, which is schematically illustrated in FIG. 6 as disposed in a cylinder 93, with a resilient means such as spring 94 urging the piston 92 to the right. The piston 92 has a piston stem 92a therewith which is connected to pivot block 87 by a flexible joint connection indicated at 95, of any suitable configuration. Fluid pressure is introduced into the cylinder 93 on the side of the piston 92 opposite from the spring 94 through any suitable inlet tubing such as indicated at 96. The inlet tubing 96 is connected to the fluid or hydraulic system used for actuating the brake shoes 60 so that when the fluid pressure in the system for supplying fluid to the brake shoes 60 is in operating condition, the pressure of the fluid will act against the piston 92 to maintain it in the position shown in FIG. 6, wherein the spring 94 is compressed and the blocks 87 are pivoted upwardly to release the frictional engagement between the brake band 83 and the brake drum 80. Therefore, when the fluid pressure within the system used for actuating the brakes 60 is at a normal, safe operating amount, the brake band 83 does not cause and braking action with respect to the drum 80. However, upon a decrease in the fluid presure in the system so that pressure in the cylinder 93 drops below a predetermined point, the spring 94 urges the piston 92 to the right as viewed in FIG. 6 to swing blocks 87 downwardly about the pivot pin 86, thereby tightening the band 83 on the drum 80 to provide braking action, for thereby preventing the reel R from rotating. When the pressure of the system is restored sufficiently to move the piston 92 to the released position of FIG. 6, the brake band 83 is then again released so that it is inoperative until another failure of the fluid pressure system.

The operation of the apparatus of the present invention involves control of the reel R during the winding and unwinding of the wireline W or other similar element with respect to the reel R. Such control of the reel R is effected with the transmission assembly of the present invention.

For example, during the winding of the wireline W on the reel R, the motor M is actuated, and variable speeds may be obtained. The lowest speed is obtained when the disc 37 is braked and the disc 50 is free to rotate. The higher speed may be obtained by braking the disc 50 while the disc 37 is free to rotate. In each of such operating conditions, the output speed may be varied by varying the input speed of the motor M, if desired.

In other instances, both of the discs 37 and 50 may be released for a free wheeling of the reel R, with the motor M disconnected or turned off. Such free-wheeling operation may be used for the unwinding or lowering of the wireline W into a well or for performing a similar operation. During such lowering of the wireline W, the feeding off of the wireline W may be controlled by a partial braking of the discs 37 and 50. If it is desired to completely stop the reel R from unwinding the wireline W, both of the brakes 37 and 50 may be fully engaged with the brake shoes 60 so that the reel R is totally braked. Also, as pointed out heretofore, the safety brake B functions in the event the fluid pressure in the brake system falls below a predetermined amount so that the reel R is automatically braked to prevent it from rotating under such conditions.

Thus, it can be seen that the present invention provides a transmission assembly which may be controlled as to speed and during free wheeling of a reel R or the like attached thereto without using clutches or shifting gears to accomplish the changes in the operation. The variable speeds possible using the gear ratio and the high gear ratio and the variable speed of the motor M provides for versatile operation throughout a wide speed range. A constant speed motor M may be used, in which event only the two speeds are available when the transmission is driven by the motor M.

The foregoing disclosure and description of the invention are illustrative and explanatory thereof, and various changes in the size, shape, and materials as well as in the details of the illustrated construction may be made within the scope of the appended claims without departing from the spirit of the invention.

I claim:
1. A transmission assembly for connection with a reel to perform multiple operations therewith, comprising:
   (a) an input shaft adapted to be connected to an input power source;
   (b) an output shaft adapted to be connected to a reel;
   (c) an input planetary gear system including an input sun gear and input planetary gears operably connected to and adapted to be driven by said input shaft;
   (d) means operably connecting said input planetary gears to said output shaft for transmitting rotation thereto from said input shaft;
   (e) a rotatable support mounted on said output shaft for rotation relative thereto;
   (f) an input internal ring gear carried by said rotatable support and forming a part of said input planetary gear system;
   (g) a first brake disc mounted on said rotatable support member for movement therewith;
   (h) first brake shoe means for frictionally engaging said first brake disc to stop or control the speed of rotation of said ring gear;
   (i) an output planetary gear system operably mounted on said output shaft;
   (j) said output planetary gear system including an output sun gear, a plurality of output planetary gears, and an output internal ring gear;
   (k) means connecting said rotatable support with said output sun gear for rotating said output sun gear in synchronism with said input internal ring gear;
   (l) a second brake disc operably connected to said output planetary gears;
   (m) second brake shoe means for frictionally engaging said second brake disc to stop or control the speed of rotation of said output planetary gears relative to said output sun gear and said output ring gear; and
   (n) means connecting said output ring gear with said output shaft.
2. The structure set forth in claim 1, including:
   (a) an additional planetary gear system between said input shaft and said input planetary gear system.
3. The structure set forth in claim 1, including:
   (a) a fluid-pressure system for actuating said input braking means.
4. The structure set forth in claim 1, including:
   (a) a fluid-pressure system for actuating said input braking means; and
   (b) safety brake means for automatically preventing rotation of the reel in the event the pressure of the fluid in said fluid-pressure system falls below a predetermined amount.

References Cited

UNITED STATES PATENTS

| | | | |
|---|---|---|---|
| 2,592,537 | 4/1952 | Burtnett | 74—765 X |
| 2,612,792 | 10/1952 | Wilson et al. | 74—764 X |
| 2,621,546 | 12/1952 | Cleff | 74—758 |
| 3,116,817 | 1/1964 | Quick et al. | 74—764 X |
| 3,150,544 | 9/1964 | Brass | 74—764 X |
| 3,234,820 | 2/1966 | Tuck et al. | 74—765 X |

BENJAMIN W. WYCHE III, Primary Examiner

U.S. Cl. X.R.

74—764; 192—4